(12) United States Patent
Copner et al.

(10) Patent No.: US 6,415,067 B1
(45) Date of Patent: Jul. 2, 2002

(54) N X M OPTICAL SWITCH

(75) Inventors: Nigel Copner, North Gower; Mark Farries, Nepean; Adam D. Cohen, Nepean; Rajiv Iyer, Nepean, all of (CA)

(73) Assignee: JDS Uniphase Inc., Ottawa ( * ) Notice: Subject to any disclaimer, the term of this patent is extended or adjusted under 35 U.S.C. 154(b) by 217 days.

(21) Appl. No.: 09/594,820

(22) Filed: Jun. 16, 2000

Related U.S. Application Data

(63) Continuation-in-part of application No. 09/334,502, filed on Jun. 17, 1999, now Pat. No. 6,154,585.

(51) Int. Cl.[7] .............................................. G02B 6/42
(52) U.S. Cl. ........................ 385/16; 359/127; 359/627; 385/140; 385/124
(58) Field of Search ............................ 385/16–24, 124, 385/140, 147; 359/159, 627

(56) References Cited

U.S. PATENT DOCUMENTS

| | | | | |
|---|---|---|---|---|
| 5,325,459 A | * | 6/1994 | Schmidt ...................... 385/140 |
| 5,900,983 A | * | 5/1999 | Ford et al. .................... 359/627 |
| 6,154,585 A | * | 11/2000 | Copner et al. ................ 359/124 |
| 6,167,185 A | * | 12/2000 | Smiley et al. ................. 385/140 |
| 6,222,656 B1 | * | 4/2001 | Eu .................................. 359/127 |
| 6,266,474 B1 | * | 7/2001 | Han et al. ....................... 385/11 |
| 6,353,692 B1 | * | 3/2002 | Colbourne ..................... 385/16 |

* cited by examiner

*Primary Examiner*—Akm E. Ullah
(74) *Attorney, Agent, or Firm*—Neil Teitelbaum

(57) ABSTRACT

An optical switch is disclosed having 4-ports. The switch consists of a first GRIN lens having 2 ports adjacent its outwardly facing end face. A second GRIN lens is disposed to receive light from the first GRIN lens and has two ports adjacent its outer end face. In a first state, a first port from the first GRIN lens couples light with a first output port of the second GRIN lens. In a second state, a movable optical element in the form of a light transmissive wedge having a reflective surface, is disposed in the path between first and second GRIN lens, providing a connection between a port of the first GRIN lens and a second port of the second GRIN lens. In a third connect state, the reflective surface of the wedge connects a port of the first GRIN lens and an output port in the same first GRIN lens. Hence an N×M optical switch is disclosed.

18 Claims, 6 Drawing Sheets

N X M OPTICAL SWITCH

This application is a continuation-in-part of Ser. No. 09/334,502 filed Jun. 17, 1999, now U.S. Pat No. 6,154,585.

FIELD OF THE INVENTION

This invention relates generally to optical switches and more particularly, to an optical switch having a movable wedge or a plurality of movable wedges, which serve to steer a beam of light.

BACKGROUND OF THE INVENTION

Optical switches of various kinds are well known for selectively switching light from a waveguide, such as optical fibre or light-conducting path, to another.

To fulfill this requirement, it has been well known to provide 2×2 optical switches having two ports on each side, wherein the switch is configurable to make a connection between ports 1 and 2 and simultaneously to provide a connection between ports 3 and 4. Alternatively, such switches are configurable to provide simultaneous connections between ports 1 and 4, and ports 3 and 2. Hence these prior art switches have two states; a first state wherein two bar connections are formed and a second state wherein 2 cross connections are formed. Providing suitable coupling in both switching states, and providing a switch that is fast enough, and tolerant of physical disturbances is a daunting task most switch manufacturers face.

A well known optical switch made by JDS Fitel Inc. has been sold in the United States since Feb. 11, 1992 under the product number SR22xx-ONC. This optical switch includes a pair of GRaded INdex (GRIN) lenses having a reflector or mirror that can be selectively disposed therebetween. Each GRIN lens has two ports offset from the optical axis (OA) of the lens.

In a graded index medium that has a refractive index that varies with position, optical rays follow curved trajectories, instead of straight lines. By judicious selection of the refractive index, a GRIN rod can behave like a conventional optical element such as a prism or a lens. Lenses of this type are produced under the trade name "SELFOC"; the mark is registered in Japan and owned by the Nippon Sheet and Glass Co. Ltd. GRIN lenses are used extensively as a means of coupling optical signals from one waveguide such as an optical fiber, to another, for example, in optical switches. The use of GRIN lens provides a number of advantages over other conventional lenses. For example, GRIN lenses are relatively inexpensive, compact, and furthermore have parallel flat end faces. In particular, the flat end face of the GRIN lens allows a single lens to be used as a means of collimating or focusing light.

An optical arrangement is shown in FIG. 1, wherein two quarter pitch GRIN lenses 10a and 10b are disposed so that their collimating ends are adjacent one another in a back-to-back relationship. A very thin optical element in the form of a filter 12 is sandwiched therebetween. The filter 12 can be coated directly on one of the inwardly facing end faces of the lenses, or alternatively may be coated on a substrate that is anti-reflection coated and sandwiched between the two GRIN lenses 10a and 10b. It should be noted, that the optical axes of the input/output fibres 11a and 11b are parallel with the optical axes of the two GRIN lenses. Since the beam traversing the lenses 10a and 10b about the filter element 12 is at a location substantially coincident with the optical axes of the GRIN lenses, the light input orthogonal to the end face of the lens 10a at port $P_1$, propagates through the filter 12 and through the second lens 10b and exits at port $P_2$ as a focused beam that is parallel to the input beam and the optical axes of the lenses 10a and 10b.

FIG. 2 illustrates an offset that occurs when a gap is present between a pair of coaxial GRIN lenses 12a and 12b. The beam exiting the lens 12a intersects the end face equidistant from the optical axis indicated by lines 20a and 20b, which define the outer most limits of the beam as it traverses the lens 12a end face. However, due to the gap between the lenses 12a and 12b, the beam traverses the inwardly facing end face of the lens 12b having its outermost limits defined by the locations 22a and 22b which are not equidistant from the optical axis OA of the second lens 12b. This beam shift downward results in the output beam being directed upward along the optical axis of the optical fibre 14b. Accordingly, substantial coupling losses may occur between an input port on a first GRIN lens and an output port on a second GRIN lens, when the input and output ports are disposed adjacent the optical axes of the two GRIN lenses, and wherein a gap separating the GRIN lenses causes a beam propagating from the input port through the first GRIN lens to be shifted as it traverses the element towards the output port and enters the second lens at an offset to the optical axis of the lens. To overcome this disadvantage and to provide a more efficient optical coupling, the fibre 14b is provided at an angle θ>0 degrees with respect to the optical axis of the lens.

It is also possible, as shown in FIG. 3, to launch the beam 30 at a judiciously selected angle $θ_S$ at the left input end face of the GRIN lens 16b in such a way that the beam is selectively directed towards a desired output port location at the right output end face of the GRIN lens 16b. Moreover, by ensuring that the beam has its centre substantially coincident with the optical axis OA of the lens, the beam thus propagates through the lens 16b and exits the output end of the lens parallel to the OA of the lens. From a manufacturing standpoint, when using GRIN lenses in switches or routers, it is preferable to use a transmissive switching optical element, in which zero or a number of internal reflections in each plane, and/or any number of refractions, are imposed on the incident light between the lenses rather than a reflective element imposing one reflection, to route, shift, or direct a beam from one port to an alternate port when the element is disposed between lenses. Thus, by providing a transmissive element such as a prism, the switch is much less sensitive to angular deviation and misalignment of the element than a switch using a reflective element such as a mirror. For example, in comparing angular sensitivity based on a 0.05 dB excess insertion loss criterion, an existing single mirrorbased switch has a typical angular tolerance of 0.007 degrees. An existing prism-based switch has an angular tolerance of 0.03 degrees, whereas the transmissive optical wedge-based switch described in accordance with this invention has an angular tolerance of 1.4 degrees.

It is an object of the instant invention to provide an improved optical switch having a transmissive wedge movable between two GRIN lenses for changing the angle of the collimated beam by a selected amount so that the output beam exits the output end face substantially parallel to the optical axis of the GRIN lenses, regardless of the connect state.

It is an object of this invention to provide a relatively inexpensive and easy to manufacture switch that will serve as an N×M optical switch.

SUMMARY OF THE INVENTION

In accordance with this invention, there is provided an optical switch comprising:

at least one input port on one side for launching an optical signal along an input optical path;

at least two output ports on an opposite side for receiving the optical signal, a first of the at least two output ports optically coupled to the at least one input port; and a light transmissive wedge having at least two non-parallel surfaces, the wedge movable into and out of the input optical path, the wedge movable at least between first, second, and third positions corresponding to first, second, and third connect states, respectively.

In accordance with this invention, there is provided a method for switching a beam of light from one of a plurality of output ports to another, comprising the step of:

receiving at an input port a beam of light parallel to the optical axis of a first GRIN lens, the first GRIN lens for collimating the beam of light;

transmitting the optical signal along an optical path to a second GRIN lens optically coupled to the plurality of output ports, the second GRIN lens for focussing the beam of light; and inserting a wedge in the optical path for modifying the optical path so that the signal switches from one of the plurality of output ports and so that the beam of light exits the second GRIN lens at a predetermined output port of the plurality of output ports substantially parallel to the optical axis of the GRIN lens.

BRIEF DESCRIPTION OF THE DRAWINGS

Exemplary embodiments of the invention will now be described in conjunction with the drawings in which.

DETAILED DESCRIPTION

Figure 1:
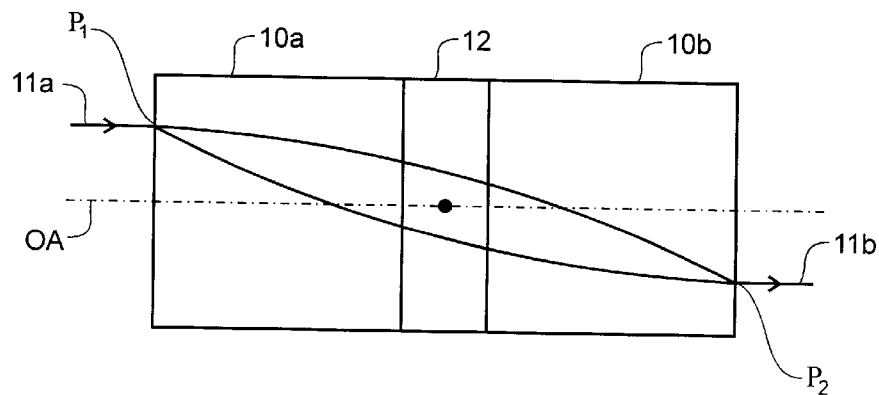
FIG. 1 is a prior art side view of a conventional block diagram depicting an optical device having a pair of coaxial GRIN lenses and a very thin filtering element disposed therebetween.
Figure 2:
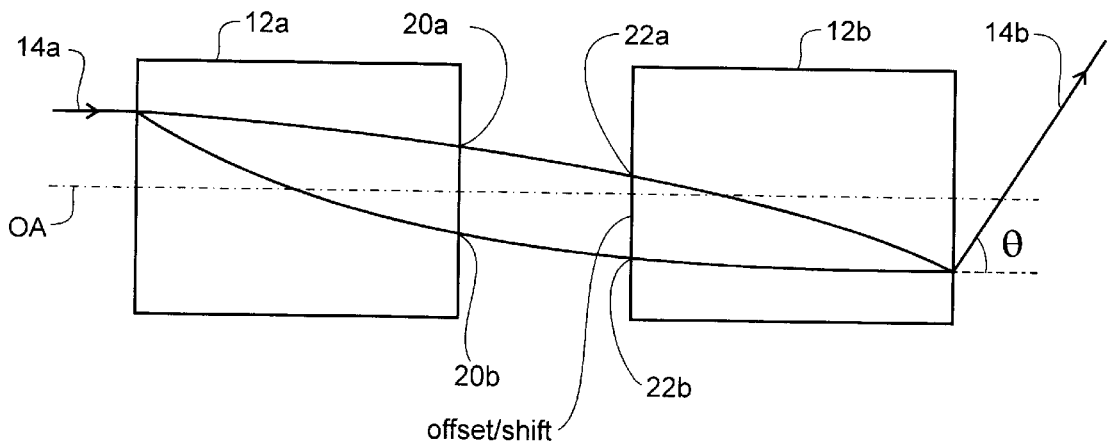
FIG. 2 is a side view of a prior art diagram of a coupling system wherein losses are reduced by angling a receiving output fibre with respect to the angle of the input fibre.
Figure 3:
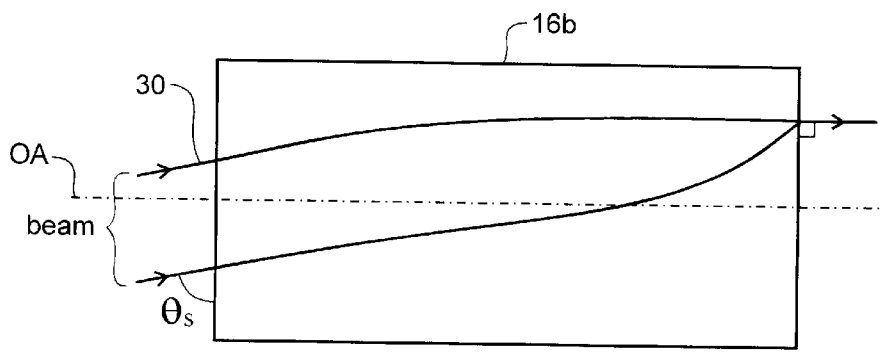
FIG. 3 is a side view of a diagram of a GRIN lens receiving a collimated beam concentric with the optical axis and angled such that it exits the lens at a selected output port parallel to the optical axis of the lens.
Figure 4A:
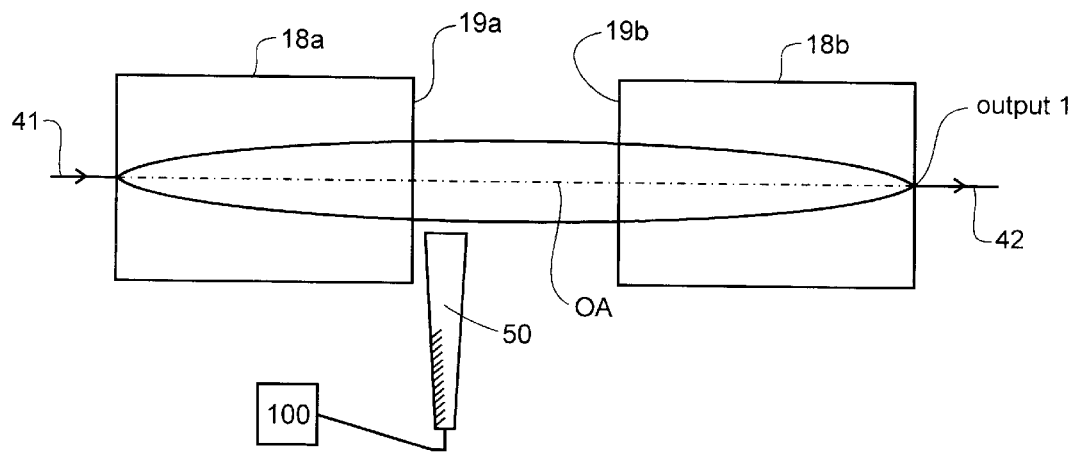
FIG. 4a is a side view of a diagram showing the first connect state in accordance with the invention wherein a beam of light is collimated and focussed by a pair of coaxial GRIN lenses.
Figure 4B:
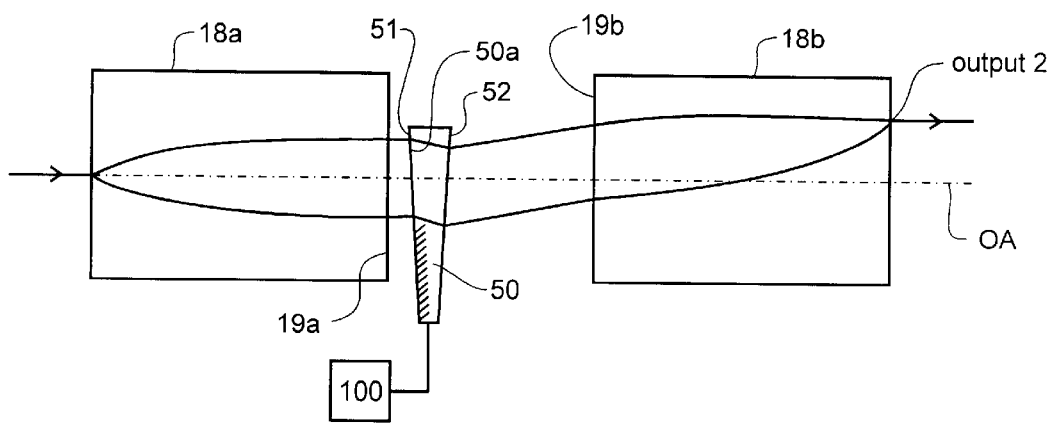
FIG. 4b is a side view of a diagram showing the second connect state in accordance with the invention wherein a beam of light is collimated and focussed by a pair of coaxial GRIN lenses having a first light transmissive asymmetric wedge disposed therebetween.
Figure 4C:
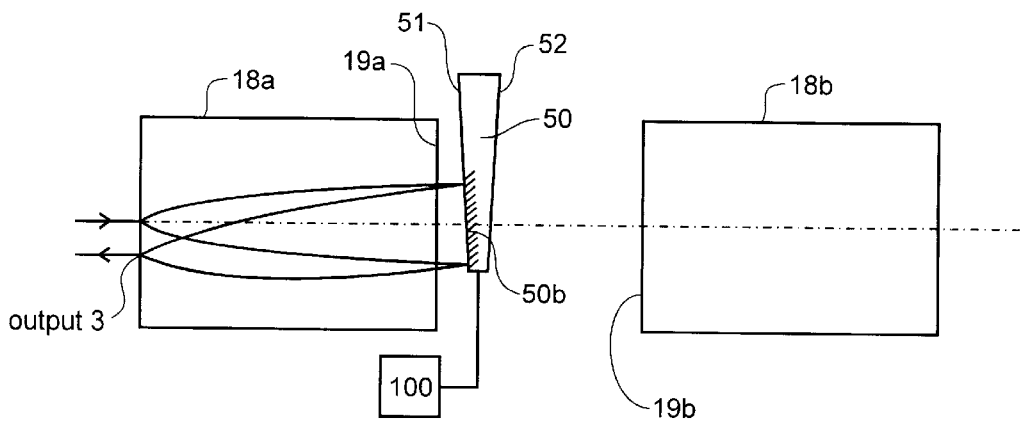
FIG. 4c is a side view of a diagram showing the third connect state in accordance with the invention wherein a beam of light is collimated, reflected on a reflective surface of the wedge, and focussed by a GRIN lens.

Preferred embodiments of this invention are based on the use of a light transmissive wedge or a wedge having a light transmissive region such as shown in FIGS. 4b and 4c.

FIG. 4a shows the first connect state of the optical switch in accordance with an embodiment of the invention wherein a wedge 50 is moved out of the beam path. A pair of quarter pitch GRIN lenses 18a and 18b, having end faces parallel to each other, disposed back to back sharing the same optical axis are slightly spaced apart. Two lo optical waveguides 40a and 40b are shown coaxial with and coupled to the lenses along the optical axis of the lenses 18a and 18b shown by a dotted line. A beam profile is also shown within the lenses 18a and 18b as if light was launched from the waveguide 40a to the respective lens 18a and exited the lens 18b at output 1 to the waveguide 40b.

FIG. 4b illustrates the second connect state wherein an actuator, for example in a form of a three-position actuator 100, moves the wedge 50 into the path of the beam between the coaxial GRIN lenses 18a and 18b. The wedge 50 is defined herein as an optical medium an having two non-parallel surfaces, which for exemplary purposes are shown as input end 51 and output end 52. The angle between the two non-parallel surfaces and the centre thickness of the wedge are judiciously chosen to give optimal fibre coupling. Either the upper half or the lower half area of the wedge facing the collimating GRIN lens is coated with a reflective coating. Similarly, either the other of the upper half or the lower half area of the wedge facing the collimating GRIN lens is light transmissive. The input end face 51 of the wedge 50 is facing the end face 19a of the GRIN lens 18a; the angle existing between the surface 51 and the optical axis of the GRIN lens 18a is substantially about 90°. The output end face 52 of the wedge 50 is facing the input end 19b of the second GRIN lens 18b; the second non parallel surface 52 is not normal to the optical axis of the GRIN lens 18b.

In operation, in this embodiment, a beam of light parallel to the optical axis is launched into the input end of the GRIN lens 18a; at the end face 19a, the collimated beam concentric with the optical axis of the lens exits the lens and is incident on the transmissive surface 50a of the wedge 50. The beam is slightly refracted into the wedge and exits the wedge 50 at the face 52 oriented towards the input end 19b of the lens 18b.

The angle of the surface 52 with respect to the end face 19b of the lens 18b is chosen to ensure that the light enters the input end 19b of the lens 18b and is directed towards an output port 2. The substantial coincidence of the beam of light with the optical axis allows the focussed beam to exit the lens 18b substantially parallel to the optical axis at the output port 2.

The third connect state is illustrated in FIG. 4c. The three-position actuator 100 moves the wedge 50 into the path of the beam between the coaxial GRIN lenses 18a and 18b. The wedge 50 is the same wedge described previously. The wedge is placed such that the reflective surface 50b of the surface 51 faces the end face 19a of the lens 18a.

A beam of light parallel to the optical axis is launched into the input end of the GRIN lens 18a; at the end face 19a of the GRIN lens 18a, the collimated beam substantially concentric with the optical axis of the lens exits the lens and is incident on the reflective surface 50b of the wedge 50. The beam is then reflected back into the same GRIN lens 18a. The angle between the surface 51 and the optical axis is substantially about 90°. The exact angle is chosen to ensure that the collimated light is redirected toward output port 3. Moreover, the reflective beam of light is substantially concentric with the optical axis of the lens, thus the focussed beam exits the lens 18a substantially parallel to the optical axis at the output port 3 located on the same end face that the input beam was launched through.

Figure 5A:
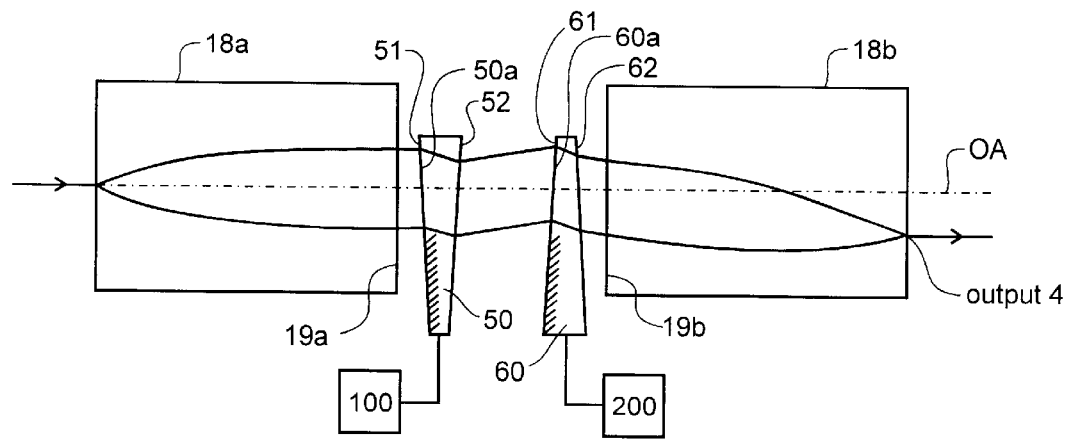
FIG. 5a is a side view of a diagram showing a fourth connect state in accordance with an other embodiment of the invention wherein a beam of light is collimated and focussed by a pair of coaxial GRIN lenses having a first and a second light transmissive asymmetric wedge disposed therebetween.

It is also within the scope and spirit of the present invention to provide and add a plurality of wedges between two substantially coaxial GRIN lenses and to increase the number of ports. For example, by adding one or more movable wedges 60 similar but not identical to the wedge 50 previously described, between the output surface 52 of the wedge 50 and the input end 19b of the lens 18b, the number of output ports is changed. Such an embodiment is shown in FIG. 5 that details the different connect states achieved when a second movable asymmetric light transmissive wedge 60 having two non-parallel to each other surfaces forming an input end 61 and an output end 62 is inserted into the switch. The second wedge 60 is moved in or out of the path of the beam of light with a second three-position actuator 200. In FIG. 5a, the three-position actuator 200 moves the wedge 60 into the path of the beam between the wedge 50 and the input face of the GRIN lens 18b. The input end face 61 of the wedge 60 is oriented towards the output end face 52 of the wedge 50; the output end face 62 of the wedge 60 is oriented towards the input end 19b of the second GRIN lens 18b.

In such configuration, a beam of light parallel to the optical axis is launched into the input end of the GRIN lens 18a; at the end face 19a of the GRIN lens 18a, the collimated beam concentric with the optical axis of the lens exits the lens and is incident on the transmissive surface 50a of the wedge 50. The beam is then slightly refracted into the wedge and exits the wedge at the surface 52 oriented towards the transmissive surface 60a of the wedge 60; the beam is slightly bent into the wedge 60 and exits the wedge at the surface 62 oriented towards the input end 19b of the lens 18b. The angle of the surfaces 61 with respect to the optical axis on one hand and the angle of the surface 62 with respect to the optical axis on another hand are chosen to ensure that the light enters the input end 19b of the lens 18b and is directed towards an output port 4. The coincidence of the beam of light with the optical axis makes the focussed beam exiting the lens 18b substantially parallel to the optical axis at the output port 4.

Figure 5B:
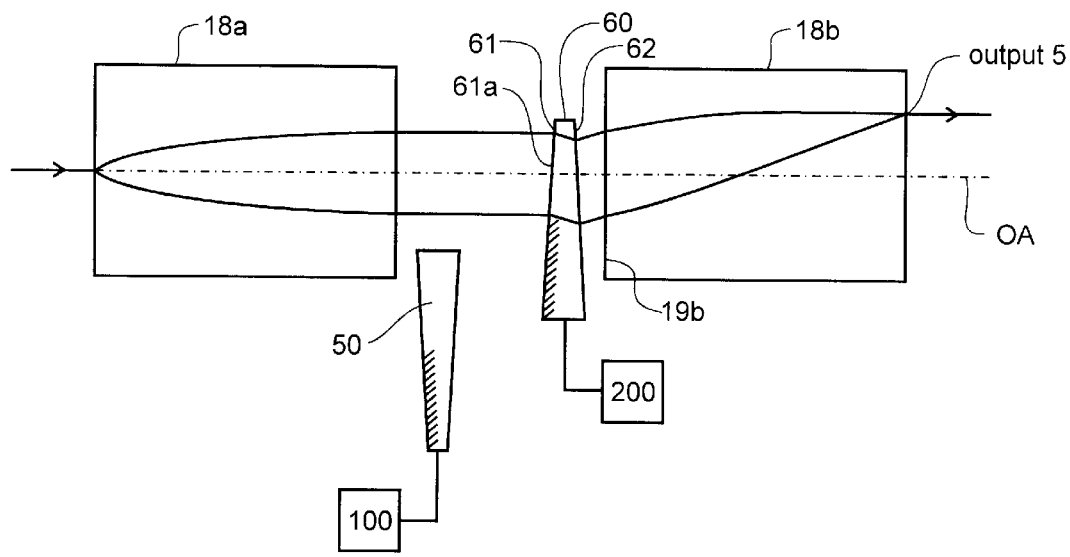
FIG. 5b is a side view of a diagram showing a fifth connect state in accordance with another embodiment of the invention wherein the first wedge is moved out of the path of the beam of light and the second wedge is into the path of the beam and disposed between a pair of coaxial GRIN lenses.

FIG. 5b shows a fifth connect state wherein the three-position actuator 100 moves the wedge 50 out of the path of the beam whereas the three-position actuator 200 places the wedge 60 into the path of the beam of light between the coaxial GRIN lenses 18a and 18b. Because of the absence of the wedge 50, the beam of light exiting the output end 19a of the lens 18a propagates through the air before contacting the input transmissive surface 60a of the wedge 60. The beam of light is refracted into the wedge 60 and exits the wedge at the output surface 62 oriented towards the input end 19b of the lens 18b. The angle of the surfaces 61 and 62 with respect to the optical axis are chosen to ensure that the light enters the input end 19b of the lens 18b and is directed towards an output port 5. The coincidence of the beam of light with the optical axis makes the focussed beam exiting the lens 18b substantially parallel to the optical axis at the output port 5.

Figure 5C:
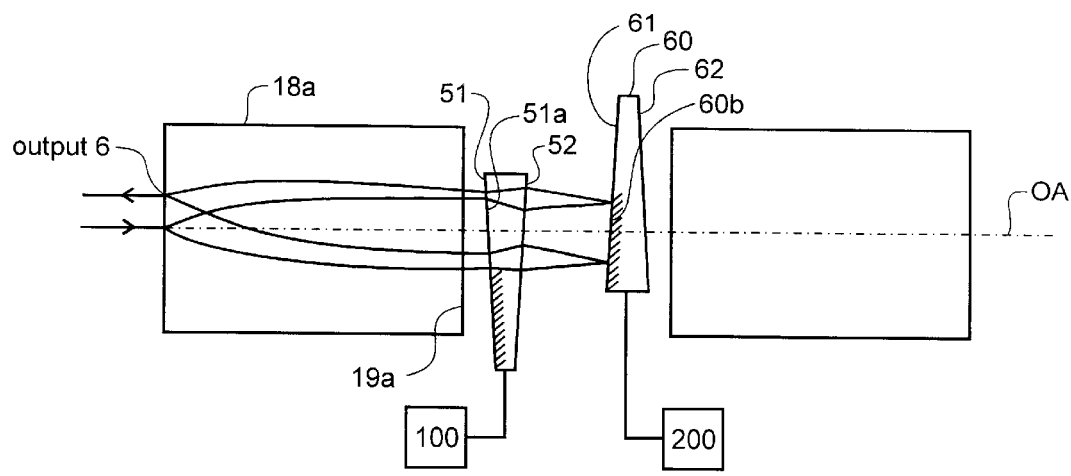
FIG. 5c is a side view of a diagram showing a sixth connect state in accordance with an embodiment of the invention wherein a beam of light is collimated by a GRIN lens, refracted through the first wedge, reflected on a reflective surface of the second wedge, sent back to the first wedge and focussed by the same GRIN lens.

A sixth connect state is illustrated in FIG. 5c. The three-position actuators 100 and 200 move the wedges 50 and 60 into the path of the beam between the coaxial GRIN lenses 18a and 18b. The wedge 50 is moved in a position allowing the beam of light to pass therethrough in its second connect state, i.e., the transmissive surface 50a is oriented towards the end face 19a of the lens 18a. The wedge 60 is placed such that the reflective surface 60b of the surface 61 is oriented towards the end 52 of the wedge 50.

A beam of light parallel to the optical axis is launched into the input end of the GRIN lens 18a; at the end face 19a of the GRIN lens 18a, the collimated beam concentric with the optical axis of the lens exits the lens and enters the input transmissive face 50a of the wedge 50; the beam is bent into the wedge and exits the wedge 50 at the output end 52 to propagate to the wedge 60 where it contacts the reflective surface 60b of the wedge 60. The beam is reflected back into the wedge 50. The beam is refracted again while propagating through the wedge 50 and is directed towards a selected output port 6, located on the same end face that the input beam was launched through. Moreover, the reflective beam of light is substantially concentric with the optical axis of the lens, thus the focussed beam exits the lens 18a substantially parallel to the optical axis at the output port 6.

Figure 5D:
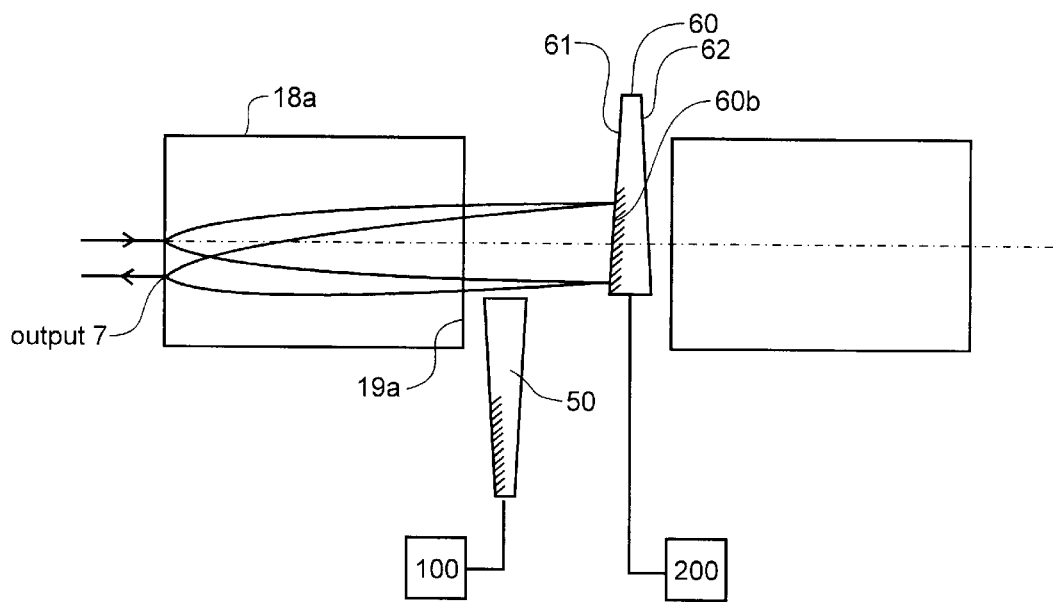
FIG. 5d is a side view of a diagram showing a seventh connect state in accordance with an embodiment of the invention wherein a beam of light is collimated, reflected on a reflective surface of the second wedge, and focussed by a GRIN lens whereas the first wedge is moved out of the path of the beam of light.

FIG. 5d shows a seventh connect state where the wedge 50 is moved out of the path of the beam by the three-position actuator 100 whereas the three-position actuator 200 positions the reflective surface 60b of the wedge 60 in the path of the beam of light.

In such configuration, a beam of light parallel to the optical axis is launched at the input end of the GRIN lens 18a; at the end face 19a of the GRIN lens 18a, the collimated beam concentric with the optical axis of the lens exits the lens to contact the reflective surface 60b of the wedge 60. The beam is then reflected back into the same GRIN lens 18a. The angle of the surface 61 is chosen to ensure that the collimated light is redirected toward output port 7. Moreover, the reflective beam of light is substantially concentric with the optical axis of the lens, thus the focussed beam exits the lens 18a substantially parallel to the optical axis at the output port 7 located on the same end face that the input beam was launched through.

Figure 6A:
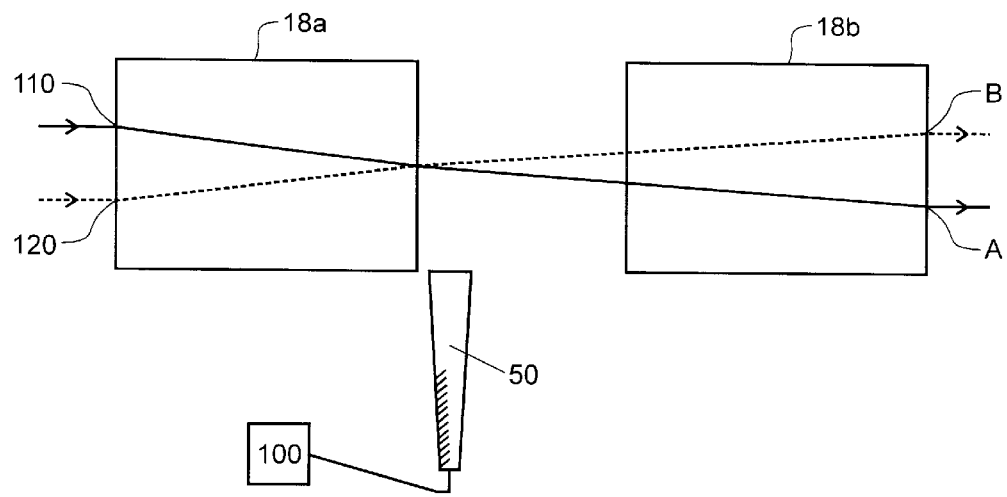
FIG. 6a is a side view diagram showing a connect state in accordance with an embodiment of the invention wherein two beams of light are collimated and focussed by a pair of coaxial GRIN lens.
Figure 6B:
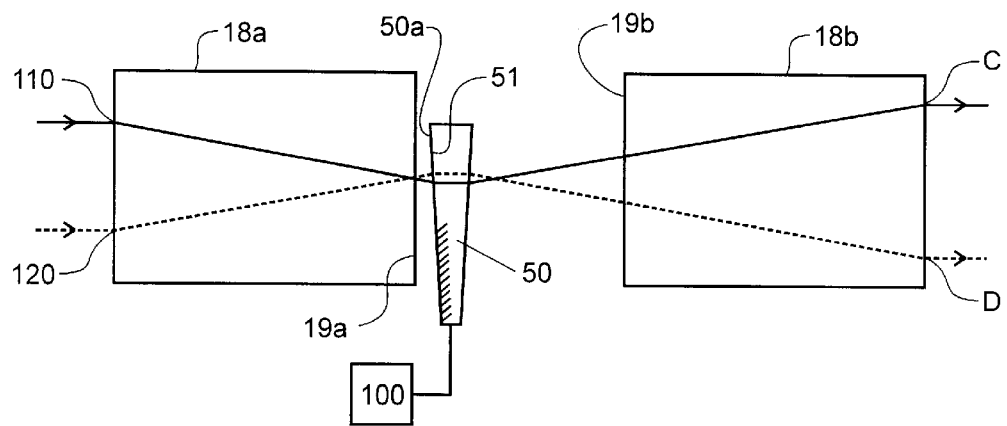
FIG. 6b is a side view diagram showing a connect state in accordance with an embodiment of the invention wherein two beams of light are collimated and focussed to two output ports by a pair of coaxial GRIN lenses having a light transmissive asymmetric wedge disposed therebetween.
Figure 6C:
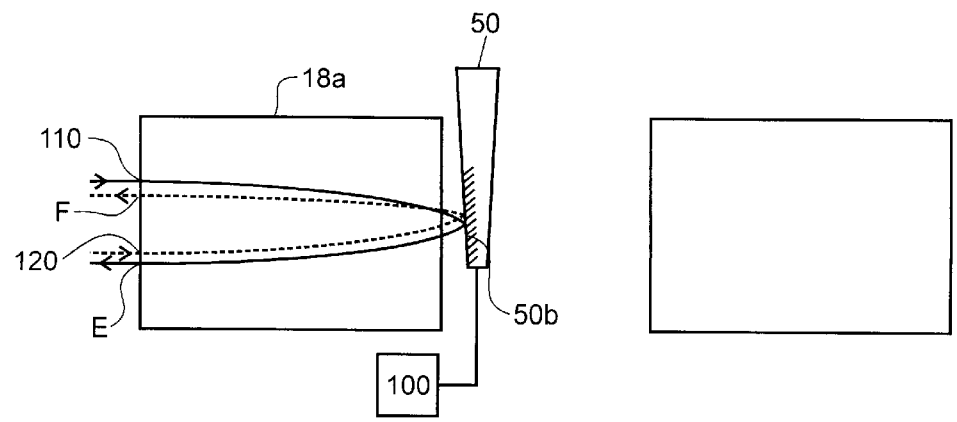
FIG. 6c is a side view diagram showing a connect state in accordance with an embodiment of the invention wherein two beams of light are collimated, reflected on the reflective surface of a wedge and focussed by a GRIN lens to two output ports located on the same side as the input ports.

FIGS. 6a, 6b and 6c illustrate an embodiment wherein additional input ports are provided. For clarity, each beam of light is represented by a single ray of light. One optical path is shown with a solid line and the other is shown with a dashed line. Only one wedge 50 is shown in this embodiment. FIG. 6a shows a connect state when the wedge 50 is moved out of the optical paths. A beam of light parallel to, and off the optical axis of the GRIN lenses 18a and 18b, launched into input port 110 is directed towards an output port A.

Another beam of light parallel to, and off the optical axis of the GRIN lenses 18a and 18b launched into input port 120 is directed towards an output port B. The substantial coincidence of the beams of light with the optical axis allows the focussed beams to exit the lens 18b substantially parallel to the optical axis at the output ports A and B.

FIG. 6b shows the paths of the beams of light when the wedge 50 is moved between the two GRIN lenses 18a and 18b such that the transmissive surface 50a of the wedge 50 is placed between the end face 19a of the GRIN lens 18a and the input face 19b of the GRIN lens 18b. The beam of light launched from the input port 110 is optically coupled to an output port C, and the beam of light launched from the input port 120 is optically coupled to an output port D. The characteristics and displacement (or position) of the wedge allow the beams of light to exit the GRIN lens 18b substantially parallel to the optical axis of the lenses.

In FIG. 6c, the actuator 100 has moved the wedge 50 between the two GRIN lenses 18a and 18b so that the reflective surface 50b of the wedge 50 is oriented towards the end face 19a of the GRIN lens 18a. In such a configuration, the beam of light launched from input port 110 is reflected back to the GRIN lens 18a and directed towards an output port E located on the same side of the input port 110. Similarly, the beam of light launched from input port 120 is reflected back to the GRIN lens 18a and focussed at an output port F located on the same side of the input port 120. The characteristics of the wedge allow the beams of light to exit the GRIN lens 18b substantially parallel to the optical axis of the lens.

Figure 7A:
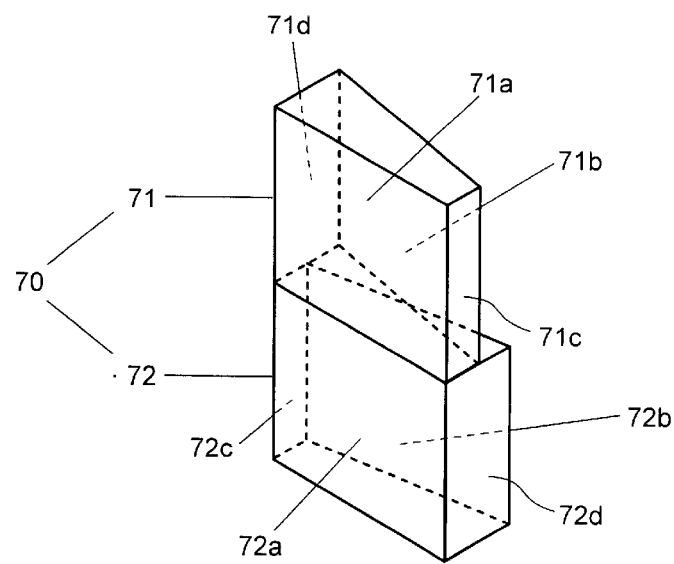
FIG. 7a shows a perspective view of a multifaceted wedge.

FIG. 7a shows a multifaceted wedge 70 having at least two different wedged-shaped parts, 71 and 72. The two wedged-shaped parts are disposed so that the wedge 71 is on the top of and in contact with the wedge 72. The wedge 71 has at least two non-parallel surfaces 71a and 71b and at least two other surfaces 71c and 71d, wherein the width of surface 71c is smaller than the width of the surface 71d. The wedge 72 has at least two non-parallel surfaces 72a and 72b, and at least two other surfaces 72c and 72d, wherein the width of surface 72c is smaller than the width of the surface 72d. The wedges are positioned so that the smallest surface 72c of the wedge 72 is below the largest surface 71d of the wedge 71, and the largest surface 72d of the wedge 72 is below the smallest surface 71c of the wedge 71. The angle between the two non-parallel surfaces and the centre thickness of the wedges 71 and 72 are selected so that, when the multifaceted wedge 70 is inserted between a pair of GIRN lenses, a beam of light incident thereon is refracted and directed towards a predetermined output port as described above.

Figure 7B:
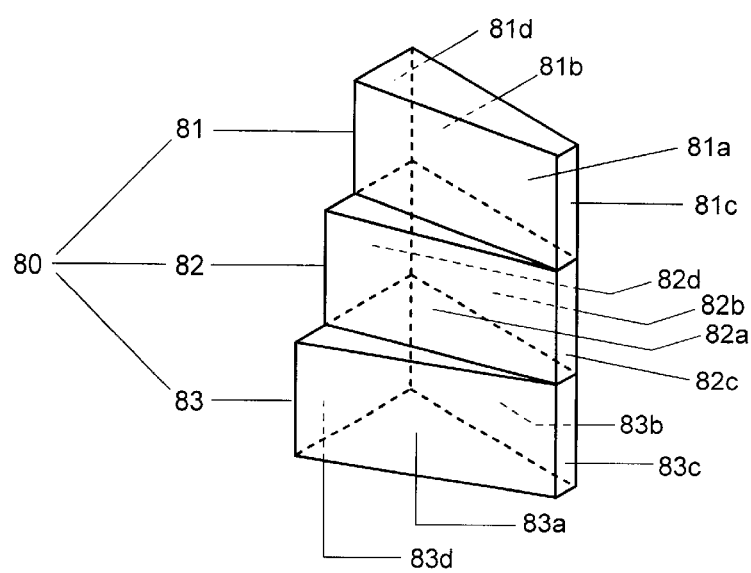
FIG. 7b is a perspective view of another multifaceted wedge.

FIG. 7b shows another example of a multifaceted wedge 80. The wedge 80 has at least three wedged-shaped parts, 81, 82 and 83. The general arrangement is that the wedge 81 is on top of and in contact with the wedge 82 which is on top of an in contact with the wedge 83. The wedge 81 has at least two non-parallel surfaces 81a and 81b and at least two other surfaces 81c and 81d, wherein the width of surface 81c is smaller than the width of the surface 81d. The wedge 82 has at least two non-parallel surfaces 82a and 82b, and at least two other surfaces 82c and 82d, wherein the width of surface 82c is smaller than the width of the surface 82d. The wedge 83 also has at least two non-parallel surfaces 83a and 83b, and at least two other surfaces 83c and 83d, wherein the width of surface 83c is smaller than the width of the surface 83d. The angles between the two non-parallel surfaces and the centre thickness of each wedge 81, 82, and 83 are different from one wedge to the other and are selected so that, when the multifaceted wedge 80 is inserted between a pair of GIRN lenses, a beam of light incident thereon is refracted and directed towards a predetermined output port as described above. In the embodiment shown in FIG. 7b, the angle and thickness of the wedge 81 are smaller than the angle and thickness of the wedge 82 which are smaller than that of the wedge 83.

Figure 7C:
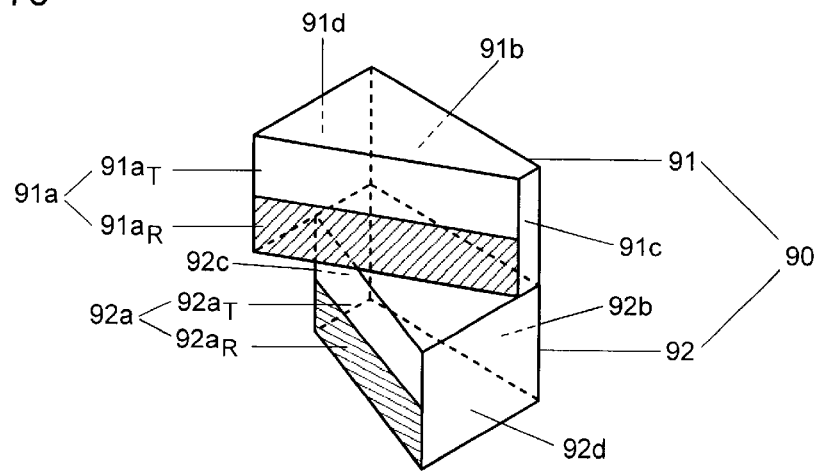
FIG. 7c is a perspective view of a multifaceted wedge having reflective areas.

FIG. 7c shows a multifaceted wedge 90 having at least two different wedged-shaped parts, 91 and 92. The two wedged-shaped parts are disposed so that the wedge 91 is on the top of and in contact with the wedge 92. The wedge 91 has at least two non-parallel surfaces 91a and 91b and at least two other surfaces 91c and 91d, wherein the width of surface 91c is smaller than the width of the surface 91d. The upper half area $91a_T$ of the non-parallel surface 91a is light transmissive, whereas the lower half area $91a_R$ of the same surface is reflective. The wedge 92 has at least two non-parallel surfaces 92a and 92b, and at least two other surfaces 92c and 92d, wherein the width of surface 92c is smaller than the width of the surface 92d. The upper half area $92a_T$ of the non-parallel surface 92a is light transmissive, whereas the lower half area $92a_R$ of the same surface is reflective. The wedges are positioned so that the smallest surface 92c of the wedge 92 is below the largest surface 91d of the wedge 91, and the largest surface 92d of the wedge 92 is below the smallest surface 91c of the wedge 91. The angle between the two non-parallel surfaces and the centre thickness of the wedges 91 and 92 are selected so that, when the multifaceted wedge 90 is inserted between a pair of GIRN lenses, a beam of light incident thereon is either refracted or reflected towards a predetermined output port.

Other configurations and modes of operation can be readily adapted, by rearranging the position of the input port. For example, the input port may be positioned so that the input beam enters the input end face of the GRIN lens 18a substantially offset from the optical axis of the lens. Moreover, in the aforementioned description, for ease of explanation, the first lens has been denoted as the input lens wherein the second lens has been denoted as the output lens; of course, the present invention is not limited to use in this direction and can be used in an alternate manner wherein the second lens functions as the input end and the first lens as the output end.

Of course, numerous other embodiments may be envisaged, without departing from the spirit and scope of the invention. For example, the pitch of the GRIN lenses may be substantially different than a quarter pitch and or the reflective surface of the wedge may face the input face 19b of the second GRIN lens 18b.

Other configurations of the wedges can easily be envisaged without departing from the spirit and scope of the invention. For example, angles and thickness' of the multifaceted wedge 70 have been described similar in the two wedged-shaped parts 71 and 72; they may be different from one part to the other.

What is claimed is:

1. An optical switch comprising:
   a) at least one input port on one side for launching a beam of light along an optical path;
   b) at least two output ports on an opposite side for receiving the beam of light, a first of the at least two output ports optically coupled to the at least one input port; first and second spaced lenses for coupling the beam of light between coupling the at least one input port and at least one of the two output port and
   c) a light transmissive wedge having at least two non-parallel surfaces, the light transmissive wedge movable into and out of the optical path, the wedge movable at least between first, second, and third positions corresponding to first, second, and third connect states, respectively.

2. An optical switch as defined in claim 1 wherein at least one of the at least two nonparallel surfaces corresponds to an input face of the light transmissive wedge and an other of the at least two non-parallel surfaces corresponds to an output face of the light transmissive wedge.

3. An optical switch as defined in claim 2 wherein the input and output faces of the light transmissive wedge are light transmissive surfaces for refracting the beam of light passing therethrough.

4. An optical switch as defined in claim 3, wherein one of the input and output surfaces comprises at least a reflective area for reflecting back the beam of light incident thereon so that the beam of light launched into the at least one input port is optically coupled to an output port located on the same side of the light transmissive wedge as the input port substantially opposite the at least two output ports.

5. An optical switch as defined in claim 4 comprising an actuator for moving the light transmissive wedge into and out of the optical path.

6. An optical switch as defined in claim 5, wherein the actuator is a three or more position actuator for positioning the light transmissive wedge at least in the first, second and third positions, wherein in the first position the actuator moves the wedge out of the optical path for providing a single connection between the at least one input port and a first output port; in the second position the actuator moves the wedge into the optical path for single connection between the at least one input port and a second output port; and in the third position the actuator moves the wedge such that the reflective area is positioned in the optical path for single connection between the at least one input port and a third output port.

7. An optical switch as defined in claim 6 wherein the first lens is a GRIN lens optically coupled to the at least one input port for substantially collimating the beam of light onto the light transmissive wedge and for focussing the beam of light reflected from the reflective surface to the third output port in the third connect state.

8. An optical switch as defined in claim 7 wherein the at least second lens is a GRIN lens substantially coaxial to the first GRIN lens and optically coupled to at least two output ports for focussing the collimated beam of light from the first GRIN lens to the first output port in the first connect state and from the light transmissive wedge to the second output port in the second connect state.

9. An optical switch as defined in claim 1 comprising at least another light transmissive wedge having at least two non-parallel surfaces, the at least other wedge movable into and out of the optical path for allowing at least a fourth, a fifth, a sixth and a seventh connect states.

10. An optical switch as defined in claim 1, comprising a first GRIN lens and a second GRIN lens, the first GRIN lens optically coupled to the at least one input port and the second GRIN lens optically coupled to the at least two output ports, the lenses being arranged such that their inner end faces are facing one another to allow the beam of light launched into the at least one input port to couple to one of the at least two output ports on the outer end face of the second lens.

11. An optical switch as defined in claim 10 comprising a multifaceted wedge movable into and out of the optical path; a multifaceted wedge corresponding to an arrangement of a plurality of light transmissive wedges in close contact, each of the light transmissive wedge having at least two non-parallel surfaces wherein a surface of the at least two non-parallel surfaces of each light transmissive wedge corresponds to an input surface and another surface of the at least two non-parallel surfaces of each light transmissive wedge corresponds to an output surface.

12. An optical switch as defined in claim 11 wherein an area of at least one facet of the multifaceted wedge is a reflective area for reflecting back the beam of light incident thereon.

13. A method for switching a beam of light from one of a plurality of output ports to another, comprising the step of:
   a) receiving at an input port a beam of light parallel to the optical axis of a first GRIN lens for collimating the beam of light;
   b) transmitting the beam of light along an optical path to a second GRIN lens optically coupled to the plurality of output ports, the second GRIN lens for focussing the beam of light; and
   c) inserting a light transmissive wedge into the optical path for modifying the optical path so that the beam of light switches from one of the plurality of output ports and so that the beam of light exits the second GRIN lens at a predetermined output port of the plurality of output ports substantially parallel to the optical axis of the GRIN lens.

14. A method as defined in claim 13 wherein the step of inserting the wedge comprises ensuring that the optical signal enters the second GRIN lens at an angle substantially concentric with the optical axis.

15. A method as defined in claim 14 wherein ensuring that the optical signal enters the second GRIN lens at an angle substantially concentric with the optical axis comprises focussing the beam of light at a specific output port of the plurality of output ports coupled to the second GRIN lens.

16. A method as defined in claim 15 wherein the step of inserting the wedge into the optical path of the beam of light comprises using an actuator for moving the wedge.

17. A method as defined in claim 16 further comprising the step of inserting at least another different movable wedge into the optical path.

18. A method as defined in claim 17 wherein the step of inserting another different movable wedge into the optical path comprises moving the other movable wedge.

* * * * *